Sept. 14, 1965    D. COSTES    3,206,368
COOLING CIRCUIT FOR A LIQUID-MODERATOR NUCLEAR REACTOR
Filed June 13, 1961    2 Sheets-Sheet 1

INVENTOR
DIDIER COSTES
BY Bacon & Thomas
ATTORNEYS

United States Patent Office 3,206,368
Patented Sept. 14, 1965

3,206,368
COOLING CIRCUIT FOR A LIQUID-MODERATOR
NUCLEAR REACTOR
Didier Costes, Paris, France, assignor to Commissariat
a l'Energie Atomique, Paris, France
Filed June 13, 1961, Ser. No. 116,739
Claims priority, application France, June 17, 1960,
830,271; May 23, 1961, 862,505
11 Claims. (Cl. 176—37)

The present invention relates to cooling circuits for liquid-moderator nuclear reactors, which allow the heat continually collected by the moderator liquid to be removed. The invention relates to reactors in which the cooling circuit of the liquid used as a moderator is separate from the heat-carrying liquid by means of which the greater part of the heat produced by fission is carried out of the reactor in order eventually to be used.

It is known that in reactors of this kind, for example the reactors using carbonic gas under pressure as the heat-carrying fluid and heavy-water as the moderator, the cooling of the moderator is generally carried out by means of a heat-exchanger comprising a heavy-water circuit and a light-water circuit. The heavy-water is taken from the tank; it is returned to the latter after passing through the heavy-water-light-water heat exchanger.

The cooling circuits of the moderator liquid comprising heat exchangers are relatively bulky; they necessitate the use of circulation pumps for the moderator liquid, and appropriate valves. This liquid is often very valuable so that numerous precautions must be taken to avoid any pollution which might cause them to lose the neutronic properties used. Among these precautions should be mentioned the creation of an atmosphere of helium at a pressure slightly higher than the atmospheric pressure above the tank containing the moderator.

The present invention has for its principal object to simplify the construction of the cooling circuit of the moderator liquid.

To this end the invention provides a cooling circuit for a liquid-moderator nuclear reactor, of the type comprising an independent heat-carrying fluid circuit ensuring, by the passage of said fluid through the pressure-tubes containing the fissile material and arranged in a moderator liquid, the removal from the reactor of the greater part of the heat produced by the phenomenon of fission, said cooling circuit comprising a condenser, at least one channel connecting the upper part of the moderator tank to the said condenser in order to admit into the latter the vapour produced by the boiling of the moderator liquid, and a second channel connecting the condenser to the moderator tank in order to send the condensate obtained in the condenser back into the said tank by gravity.

Apart from this principal arrangement, the cooling circuit according to the invention comprises a certain number of secondary arrangements which will hereinafter be explained.

In order that the invention may be more clearly understood, reference will now be made to the accompanying drawings which show embodiments thereof by way of example only, and in which.

Figure 1:
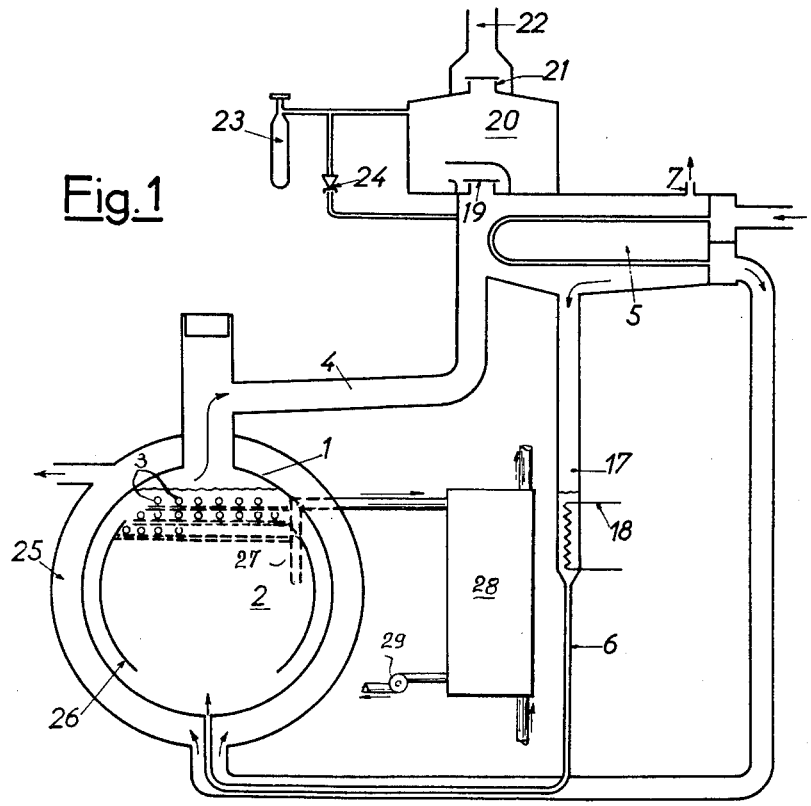
FIGURE 1 shows a diagram of a first embodiment of the cooling circuit.

In the examples chosen to describe the invention, the reactor under consideration is a reactor which is gas-cooled by means of a current of carbonic anhydride under pressure. According to the embodiment shown in FIGURE 1 the nuclear fuel is placed in parallel heat-insulating pressure tubes in a tank 1 containing a moderator liquid 2, which may be heavy-water, for example. At 3 are shown such pressure tubes which are assumed to be perpendicular to the plane of the figure. The ends of the pressure tubes open into collectors 27. The circuit of the heat-carrying fluid in connection with the collectors 27 is of a conventional type essentially comprising a heat exchanger 28 and a blower 29. By means of this circuit the greater part of the heat produced by the phenomenon of fission is evacuated to the outside of the tank 1. Another portion of this heat is released into the moderator by reason of the heat conduction of the tubes and the different nuclear radiations. In an economical arrangement for a reactor of the type in question, about 7% of the thermal power must be released from the moderator. For a high power reactor it is necessary to provide a cooling circuit for the moderator liquid.

According to the invention, the circuit in FIGURE 1 comprises, in gaseous communication via a pipe 4 with the upper portion of the tank 1, a condenser 5 the exchanging surfaces of which are cooled for example by means of a current of light-water without there being any possibility of mixing with the cooled fluid. The liquid recovered by the condenser 5 is collected by a pipe 6 communicating with the tank 1.

The heavy-water having been raised to its boiling temperature by the operation of the reactor, the heavy-water vapour which collects at the upper portion of the tank is drawn towards the condenser in which there prevails a pressure which is slightly lower by reason of the action of cooling. The condensed heavy-water returns to the tank by gravity thus establishing a continuous natural circulation.

The heat removed from the mass of the moderator contained in the tank by reason of the formation of vapour is thus transferred to the cooling water of the condenser.

The vapour can take with it gases coming from any openings and from the decomposition of the heavy-water under the action of the flow of neutrons.

The gases can be pumped at 7, a point at which the walls of the condenser are coldest, and they may be removed by several methods. In the application of a known process for the reconstitution of decomposed heavy-water, which can be used in reactors in which the heavy-water is surmounted by an atmosphere of an inert gas such as helium, a certain proportion of this atmosphere is sent into the following succession of apparatus: a cold-walled cooler, a streaming damp separator, a reheater, a catalytic contact mass, another cooler and separator, a circulation pump and then a return to the atmosphere of the reactor. For a reactor without any inert gases in the general circuit of the moderator it may be necessary, in order to obtain the most favourable operation of the catalytic mass, to dilute the gases to be recombined, in an inert gas. The succession of apparatus defined above is then used but the quantity of gas which comes therefrom is sent either between the first cooler and the contact mass or above this cooler but below the conduit which comes from the general circuit and supplies the apparatus with fluid to be treated. While the condensed water is redistributed by siphons, the inert gas does not go into the tank. The gases which cannot be recombined and which are thus removed from the general circuit are added to this inert gas, the composition and the pressure of which must be supervised, particularly when the reactor is started after filling the vacua in the general circuit of the moderator with gas. Finally oxygen may be incorporated in this case in order to facilitate the recovery of the deuterium.

Figure 2:
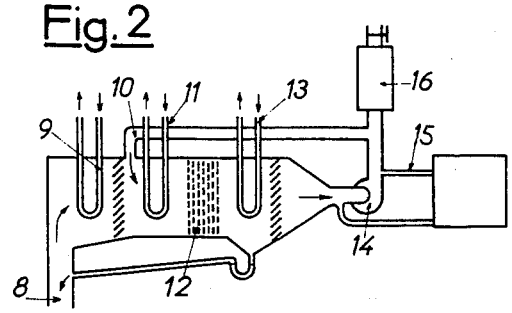
FIGURE 2 shows a diagram of a separate heavy-water recovery device usable in a circuit according to the invention.

In FIGURE 2 the device which can be used in a cooling circuit according to the invention has been diagrammatically represented. In this figure, 8 represents the arrival conduit for the heavy-water vapour, and 9 represents the first cooler and separator. The arrival point of the recirculated inert gas is at 10, the reheater is indicated at 11, the contact mass at 12, the second cooler at 13, and the ventilator which recirculates the inert gas at 14. Finally, 15 indicates the pipes for the control system of the gases, not shown in detail, one starting above and the other below the ventilator.

A contact dehydrator 16 may also be provided to eliminate the heavy-water from the exhausted gases.

An auxiliary circuit, not shown, continually treats the heavy-water of the tank in order to maintain its purity with regard to dissolved salts. So that any leaks from the general circuit may be reduced and to prevent the latter from causing pollution, the quantity and the temperature of the refrigerant fluid of the condenser may be regulated so that the pressure of the heavy-water vapour within the reactor slightly exceeds atmospheric pressure.

When the reactor is stopped and when the residual neutronic power is not enough to compensate for the losses of heat to the exterior, in spite of the stopping of the refrigerant fluid, the pressure of the general circuit of heavy-water would tend to decrease below atmospheric pressure. In order to maintain it, boiling is caused to take place in a small volume of heavy-water, for example, in FIGURE 1, in a bulge 17 in the collector pipe 6, below the hydrostatic level, by means of an electrical resistance or a heating coil 18 having a variable power. The vapour thus sent into the circuit condenses on the coldest surfaces while maintaining the pressure.

However, pressurising may accidentally occur in the enclosure for the heavy-water due for example to bad regulation of the cooling or to the explosion of a pressure tube. A violent current of carbonic gas, heavy-water and heavy-water vapour may escape.

The enclosure is protected by a flap valve 19 which is normally closed. This flap valve opens on to a chamber with an inert atmosphere, the chamber 20, which for example comprises a centrifuge device called a "cyclone" separating the heavy-water from the gases. The chamber 20 itself opens via a flap valve 21 which is normally closed either into a flue 22 or into a gas holder, which is not shown.

Since the maintenance of the pressure of the heavy-water by heating cannot be carried out, the source 23 providing the inert atmosphere may finally by operation of a flap valve 24 supply the heavy-water enclosure in order to avoid any significant drop in pressure. After such an accident when the temperature of the reactor rises, the inert gas is progressively removed by means of the extractor device shown in FIGURE 2.

It will be noted that, if stops are not very frequent, this process can be sufficient without having to provide the heating coil 18. In this case the collector pipe 6 may even be eliminated and the heavy-water may be caused to return into the tank by trickling into the large entry conduit 4, thus effecting a considerable simplification in the construction.

In the first embodiment shown in FIGURE 1 the cooling light-water is directed at the output of the condenser 5 into a tank 25 which is in good thermal contact with the tank 1; there it actually serves as a neutronic reflector and ensures part of the cooling and protects the structures surrounding the reactor while acquiring a temperature very slightly lower than that of the moderator. Since the heavy-water of the tank is for example at the surface at a pressure very slightly higher than atmospheric pressure and since it boils at 102° C., the light cooling water would pass for example from 30 to 80° C. in the condenser and from 80 to 85° C. in the tank. Thus, there is obtained a quantity of hot water which can be used for example in a steam engine heated by the reactor. In fact if a fast enough cycle is imagined in which the transferred heat is 750 U.S. therms per metric ton of vapour and per cycle the preheating from 30 to 85° C. absorbs 55 U.S. therms or 7.3% of the total thermal power which is very comparable to the percentage of 7% which is the first approximate value given for the heat recovery by the cooling circuit of the moderator and this causes the preheating by this circuit to be ensured. In the case of a reactor in which the moderator is surmounted by an auxiliary atmosphere it is not necessary, for questions of regulation, that the partial pressure of the vapour be considerable in relation to the partial pressure of inert gases and this makes it practically impossible for the moderator to exceed 70 to 80° C. if the total pressure is equal to atmospheric pressure. 50 to 60° C. is obtained for the light-water leaving the cooling exchanger. The use of this heat for preheating becomes less considerable, barring admission of the temperature of a moderator which is nearly 100° C. and a total pressure in the tank clearly higher than atmospheric pressure, and this quite considerably complicates the sealing problems.

Figure 3:
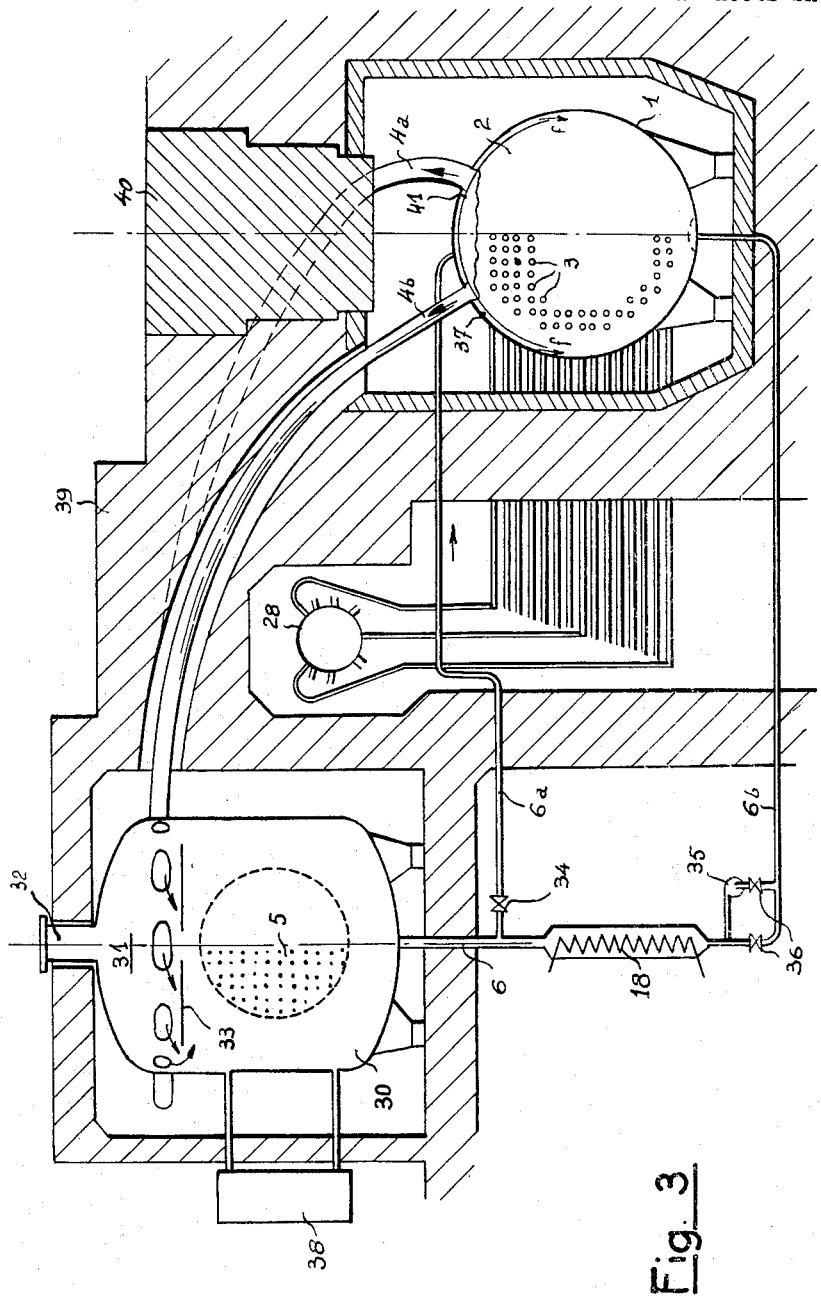
FIGURE 3 shows a diagram of a second embodiment of the cooling circuit according to the invention.

In the second embodiment according to the invention shown in FIGURE 3 the following members already mentioned in the description of the embodiment in FIGURE 1 will also be found: the tank 1 in which are arranged the pressure tubes 3 containing the fissile material of the reactor; a liquid moderator 2 contained in the tank 1; the condenser 5 ensuring the condensation of the moderator boiled in the tank 1; and a portion 28 of the circuit of the heat-carrying fluid circulating in the pressure tubes 3 and extracting the greater part of the heat produced by the phenomenon of fission.

Apart from these members, the embodiment in FIGURE 3 comprises in particular a vessel 30 containing the tubes of the condenser 5, said vessel being connected to the tank 1 containing the moderator liquid 2 by means of a number of channels 4a, 4b . . . only the first two of which are shown.

These channels 4a, 4b . . . are tangentially connected to the upper portion of the vessel 30 in such a way that in the case of an explosion in the tank 1 this portion constitutes a cyclone separator 31 allowing the gases to be released through the upper opening 32 and retaining the liquid and the solid debris in the vessel 30. These channels 4a, 4b . . . have very few angles in order to ensure a good circulation but however have sufficient curves to ensure a certain elasticity in the mechanical junction between the tank 1 and the vessel 30; for a total given section the plurality of channels 4a, 4b . . . has the following advantages in comparison with a single channel: the mechanical joint between the tank and the condenser is very flexible; the connections to the tank effect the resistance of the latter to a slighter degree; the cyclone separator functions under the best conditions; a vertical cylindrical zone above the tank 1 may be freed which particularly allows the installation of an assembly of vertical control bars passing through a stopper 40 arranged in the reactor casing 39.

On the other hand between the cyclone separator 31 and the condenser tube 5 is arranged a perforated plate 33 which has the purpose of protecting the condenser tubes 5 from direct jets. The vessel 30 is also connected to an apparatus 38 which purifies the vapour and removes the inert gases such as that described above.

Furthermore the volume of the vessel 30 is selected so as preferably to be at least equal to the volume of the tank 1 containing the moderator liquid 2 which allows, in the case of the explosion of a pressure tube 3 in the tank 1, if necessary almost all the moderator contained in the tank 1 to be admitted into the vessel 30. Such an arrangement allows the vessel 30 to act as a storage container when it is desired completely to empty the moderator 2 from the tank 1. The return of the condensed moderator towards the tank 1 is normally carried out by the pipes or channels 6 and 6a, the first being connected to the lower portion of the vessel 30 and the second to the upper portion of the tank 1. According to the embodiment shown the vessel 30 is clearly arranged above the level of the tank 1 of the reactor which allows the return of the condensate by gravity into the said tank 1, the said return being capable of being interrupted by the operation of a valve 34 arranged in the pipe 6a.

As shown in FIGURE 3, the tank 1 containing the moderator 2 is provided near its upper portion with an internal wall 41 which defines between it and the said tank a small space 37 into which opens the end of the pipe 6a through which the return of the condensed moderator in the vessel 30 of the tank 1 takes place.

This space 37 thus filled with liquid in circulation along the arrows f particularly ensures the cooling of the emergent portion of the tank 1.

Finally, in order to allow the removal of the moderator liquid from the tank 1 to the vessel 30, a pipe 6b is provided attached at one of its ends to the lower portion of the tank 1 and at the other end to the pipe 6. In this pipe 6b are provided valves 36 and a pumping device 35. Moreover on this same pipe 6b there is also provided a heating device 18 similar to that described in the preceding embodiment.

Among the advantages presented by the cooling circuits according to the invention over the circuits which comprise a considerable circulation of moderator liquid outside the tank may be mentioned the following: since the neutronic reactivity depends little upon the temperature of the moderator when the fuel reaches a considerable degree of irradiation, the quantity of heavy-water in the tank must be modified when the boiling moderator is adopted. The saving in heavy-water thus approximately corresponds to the difference in the quantities contained in the outer circuits and the advantage for the invention is considerable; the heavy-water circuit does not comprise any pumps nor corresponding large section valves; the helium circuit for superficial ventilation is eliminated; when there is condensation, since the amount treated is less and the density of the vapour is less, the connection pipes contain little heavy-water for a given length and a small extension between the condenser and the reactor is quite inexpensive, which facilitates its installation; from the point of view of bulk, the condenser can be smaller than an exchanger, because the coefficient of thermal exchange is better; the condenser of the embodiment of FIGURE 1 or the vessel of the embodiment in FIGURE 3 forms an expansion medium in the event of an explosion in the tank, and since the total section of the channel or channels or pipes which contact either the condenser or the vessel to the reactor are in any case necessary to evacuate the fluids in the case of an explosion, it may be said that all the pipes of large diameter otherwise devoted to the heavy water circuit are saved; as in a boiling water reactor, the occurrance of bubbles can contribute to a neutronic self-regulation; the fact that a liquid whose temperatures is near enough to the boiling temperature, is used for cooling the pressure tubes gives rise to a better coefficient of thermal exchange and therefore to a good homogenisation of the temperatures of the pressure tubes and to very small thermal stresses. In this connection, it might be advantageous to arrange deflectors 26 in the moderator tank, these deflectors being intended to improve the arrangement of the natural convection current; the higher temperature of the moderator slightly reduces the losses in heat of the tubes into the moderator and slightly increases the yield of heat.

Many variations may be envisaged without departing from the scope of the invention in particular the moderator can be an organic fluid and the pressure selected for boiling can be different from atmospheric pressure.

What is claimed is:

1. A liquid-moderator nuclear reactor, comprising: a moderator tank having pressure tubes therein containing fissionable material, said pressure tubes forming part of a heat-carrying fluid circuit adapted to remove the greater part of the heat produced by nuclear fission of said material; a moderator liquid adapted to be heated to a temperature above the boiling point thereof during operation of said nuclear reactor disposed in said tank in surrounding relation with respect to said pressure tubes; and a gravity flow cooling circuit independent of said heat-carrying fluid circuit providing the sole path for the circulation and cooling of said moderator liquid, said cooling circuit including a condenser mounted at an elevation above said moderator tank for cooling and condensing vapor formed as a result of heating said moderator liquid to a temperature above the boiling point thereof; at least one channel connecting the upper part of the moderator tank to said condenser in order to admit into the latter the vapor produced by the boiling of the moderator liquid; a second channel connecting the condenser to the moderator tank to provide a return passed for the gravity flow into said tank of the condensate formed in said condenser; and heating means associated with said second channel for heating a portion of the condensed moderator contained therein to the boiling point in the event of stoppage of the reactor in order to maintain the pressure prevailing in the upper portion of the tank of the moderator at a value slightly higher than atmospheric pressure.

2. A nuclear reactor as claimed in claim 1 including a cyclone separator in gaseous communication with the moderator tank and the condenser, said separator comprising a vessel for retaining the liquids and solids ejected from the moderator tank in the case of an explosion in the latter.

3. A nuclear reactor as claimed in claim 2, in which the condenser is disposed within said vessel.

4. A nuclear reactor as claimed in claim 3, in which the volume of said vessel is at least equal to that of the tank.

5. A nuclear reactor as claimed in claim 3, including means for pumping from the tank to the vessel, all of the moderator liquid contained in said tank.

6. A nuclear reactor as claimed in claim 3, in which said vapor is introduced into said vessel through ports which are distributed about the circumference of the upper portion of said vessel and are substantially tangential to the latter.

7. A nuclear reactor as claimed in claim 6, in which said condenser is disposed in the lower portion of said vessel and a perforated plate is arranged in the vessel between said ports and the condenser.

8. A nuclear reactor as claimed in claim 1, in which the moderator tank has an inner wall near its upper part defining between it and the tank a small space into which opens said second channel.

9. A nuclear reactor as claimed in claim 1 in which said heating means is disposed in said second channel immersed in said condensate.

10. A nuclear reactor as claimed in claim 1, including a purifying circuit connected with said one channel for purifying the vapor circulating between the moderator tank and the condenser.

11. A nuclear reactor is claimed in claim 1, in which the condenser includes a refrigeration circuit supplied with light-water and wherein a second tank surrounds and is spaced from the moderator tank, said refrigeration circuit outlet being connected to the space between said moderator tank and said second tank for the flow of said light-water therethrough, said light-water circulating in the second tank moreover cooling said moderator tank and constituting a reflector for the reactor.

References Cited by the Examiner

UNITED STATES PATENTS

| | | | |
|---|---|---|---|
| 2,825,688 | 3/58 | Vernon | 176—55 |
| 2,857,324 | 10/58 | De Boisblanc et al. | 176—61 |
| 2,868,708 | 1/59 | Vernon | 176—52 |
| 2,969,310 | 1/61 | Goett | 176—37 |
| 2,997,435 | 8/61 | Millar et al. | 176—59 |
| 3,039,948 | 6/62 | Krucoff | 176—60 |
| 3,052,615 | 9/62 | Johns et al. | 176—55 |

CARL D. QUARFORTH, *Primary Examiner.*

LEON D. ROSDOL, REUBEN EPSTEIN, *Examiners.*